United States Patent
Liu et al.

(10) Patent No.: US 9,929,432 B2
(45) Date of Patent: Mar. 27, 2018

(54) LOW TEMPERATURE SULFUR AND SODIUM METAL BATTERY FOR GRID-SCALE ENERGY STORAGE APPLICATION

(71) Applicant: THE REGENTS OF THE UNIVERSITY OF CALIFORNIA, Oakland, CA (US)

(72) Inventors: Gao Liu, Piedmont, CA (US); Dongdong Wang, Berkeley, CA (US)

(73) Assignee: The Regents of the University of California, Oakland, CA (US)

(*) Notice: Subject to any disclaimer, the term of this patent is extended or adjusted under 35 U.S.C. 154(b) by 521 days.

(21) Appl. No.: 14/385,030

(22) PCT Filed: Mar. 15, 2013

(86) PCT No.: PCT/US2013/032465
§ 371 (c)(1),
(2) Date: Sep. 12, 2014

(87) PCT Pub. No.: WO2014/007868
PCT Pub. Date: Jan. 9, 2014

(65) Prior Publication Data
US 2015/0044545 A1 Feb. 12, 2015

Related U.S. Application Data

(60) Provisional application No. 61/611,140, filed on Mar. 15, 2012.

(51) Int. Cl.
*H01M 2/00* (2006.01)
*H01M 10/054* (2010.01)
(Continued)

(52) U.S. Cl.
CPC ....... *H01M 10/054* (2013.01); *H01M 2/1653* (2013.01); *H01M 4/40* (2013.01);
(Continued)

(58) Field of Classification Search
CPC ............. H01M 10/054; H01M 10/056; H01M 10/0565; H01M 10/3918; H01M 10/3954;
(Continued)

(56) References Cited

U.S. PATENT DOCUMENTS

| 5,001,023 A * | 3/1991 | Cheshire | C08G 65/14 29/623.5 |
| 5,478,674 A * | 12/1995 | Miyasaka | H01M 4/485 429/223 |
| 2011/0200875 A1 * | 8/2011 | Miyuki | C01B 31/04 429/213 |

FOREIGN PATENT DOCUMENTS

WO   WO 2011154869 A2 * 12/2011 ............. H01M 4/38

OTHER PUBLICATIONS

Na-K system Wikipedia, obtained Feb. 22, 2016, Relying on Snapshot on Nov. 27, 2011.*

* cited by examiner

*Primary Examiner* — Jimmy Vo

(57) ABSTRACT

A re-chargeable battery comprising a non-dendrite forming sodium (Na)/potassium (K) liquid metal alloy anode, a sulfur and polyacrylonitrile (PAN) conductive polymer composite cathode, a polyethyleneoxide (PEO) solid electrolyte, a solid electrolyte interface (SEI) formed on the PEO solid electrolyte; and a cell housing, wherein the anode, cathode, and electrolyte are assembled into the cell housing with the PEO solid electrolyte disposed between the cathode and anode.

11 Claims, 4 Drawing Sheets

(51) Int. Cl.
*H01M 10/056* (2010.01)
*H01M 2/16* (2006.01)
*H01M 10/0565* (2010.01)
*H01M 10/39* (2006.01)
*H01M 4/40* (2006.01)
*H01M 4/60* (2006.01)
*H01M 4/66* (2006.01)

(52) U.S. Cl.
CPC ......... *H01M 4/604* (2013.01); *H01M 10/056* (2013.01); *H01M 10/0565* (2013.01); *H01M 10/3918* (2013.01); *H01M 10/3954* (2013.01); *H01M 2/1673* (2013.01); *H01M 4/661* (2013.01); *H01M 2300/002* (2013.01); *H01M 2300/0082* (2013.01)

(58) Field of Classification Search
CPC .... H01M 2/1653; H01M 2/1673; H01M 4/40; H01M 4/604; H01M 4/661
See application file for complete search history.

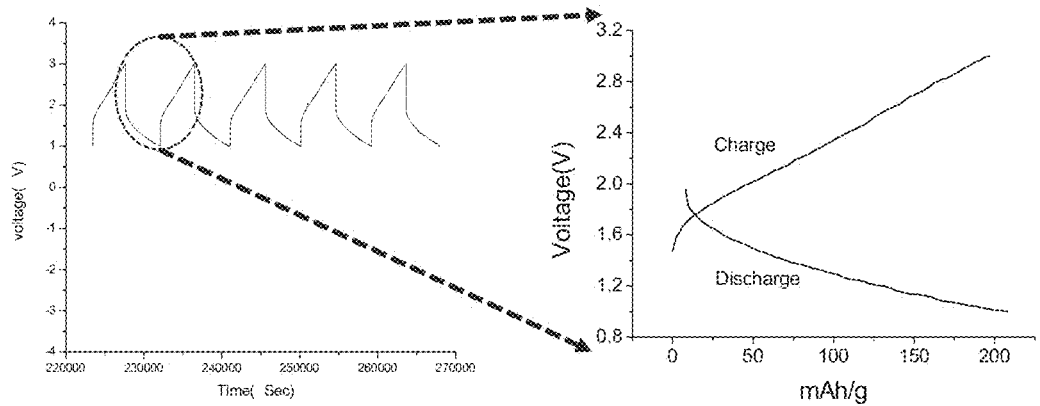
Figure 4A                    Figure 4B

LOW TEMPERATURE SULFUR AND SODIUM METAL BATTERY FOR GRID-SCALE ENERGY STORAGE APPLICATION

CROSS REFERENCE TO RELATED APPLICATIONS

This application claims priority to PCT Application PCT/US2013/032465, filed Mar. 15, 2013, which in turn claims priority to and the benefit of U.S. Provisional Application No. 61/611,140, filed on Mar. 15, 2012, which is hereby incorporated by reference in its entirety.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. The government has certain rights in this invention.

BACKGROUND OF THE INVENTION

Field of the Invention

The present invention relates to the field of sodium/potassium/sulfur rechargeable batteries.

Related Art

Elemental sulfur has the highest theoretical capacity density (1675 mA h $g^{-1}$) and the lowest cost of all known cathode materials for lithium batteries. Previous reports have shown that a sodium/sulfur (Na/S) battery demonstrates significant advantages such as high energy density (theoretical specific energy density of 760 W h $kg^{-1}$), low cost material (abundance of sulfur and sodium in nature), and low rate of self-discharge and high power density. A typical Na/S battery consists of sulfur at a positive electrode and sodium at a negative electrode separated by a solid beta alumina ceramic electrolyte. However, this type of Na/S battery must be operated at approximately 300° C. to ensure sufficient $Na^+$ conductivity in the electrolyte. At this operation temperature, both sulfur and sodium electrodes are in the liquid (molten) state. Thus, taking into consideration the extensive and even potentially explosive reactions between liquid sulfur and liquid sodium, safety is an issue for such high temperature Na/S batteries. In addition, active cathode materials (sulfur and sodium polysulfide) are corrosive and are considered to be one of the major failure mechanisms for Na/S batteries.

Another additional problem that has been previously reported is that in a Na/solid beta alumina ceramic (b-$Al_2O_3$) electrolyte/S battery, $Na_2S_2$ solid will jam the ionic channel of the solid b-$Al_2O_3$ electrolyte and the discharge process will be ended before the formation of $Na_2S_2$. As a result, the specific capacity of sulfur is actually less than 836 mA h $g^{-1}$ for a Na/b-$Al_2O_3$/S battery. Nevertheless, a room temperature design that utilizes liquid sodium as an anode remains to be an attractive solution.

Several groups are developing room temperature sodium ion batteries which are promising substitutes for lithium ion batteries in various application areas. However, in a low temperature Na/S battery, the sulfur cathode will encounter the same problems as Li/S batteries, i.e., low utilization of active material, poor rechargeability and dissolution of polysulfides into the electrolyte.

Previous studies describe sulfur composite cathode materials with sulfur embedded in a PEO polymer matrix, which exhibited good electrochemical performances in lithium batteries.

Additional studies report that sulfur composite materials were used as cathodes for room-temperature Na/S battery with a liquid electrolyte. Sodium/sulfur (Na/S) batteries were assembled with a sodium metal anode, liquid electrolyte and a sulfur composite cathode. Their electrochemical characteristics have been investigated at room temperature. Their charge/discharge curves indicate that sodium can reversibly react with sulfur at room temperature. The specific capacity of the sulfur composite cathode material in the first cycle was initially about 655 mA h $g^{-1}$ and stayed at about 500 mA h $g^{-1}$ up to the 18th cycle with about 100% charge/discharge efficiency. However, the same study reports issues with sodium dendrite formation wherein a thick black moss, so-called "sodium dendrite", covered the surface of the sodium anode. Sulfur composite cathodes could be still well charged and discharged with a fresh sodium anode. A similar phenomenon was observed in previously reported Li/S batteries. This phenomenon indicates that the dendrite is also a critical problem for room temperature Na/S batteries.

Another area of rechargeable battery research involves finding safe ways to improve conductive electrolytes. Solvent-free polymer electrolytes are of immediate interest for rechargeable lithium batteries. This is directly related to safety issues since volatile organic electrolytes (e.g. propylene carbonate) can incinerate in case of malfunction of the Li battery (e.g. thermal run-away). Poly(ethyleneoxide) (PEO), an inert polymer, belongs to the most intensively studied materials for this purpose. The fact that PEO builds complexes with Li salts and displays both thermal as well as interfacial stability makes PEO a promising candidate as polymer electrolyte. However, at room temperature the ionic conductivity of Li salts dissolved in PEO is limited because the highly symmetrical repeating units in PEO tend to crystallize. Crystalline regions in PEO (m.p. approx. 65° C.) are not available for ion transport, and conductivity is therefore limited to the amorphous regions of PEO (glass transition temperature Tg approx. −55° C.).

To address the issue of reducing crystallization in PEO and increase ionic conductivity a study reported that PEO/ionic liquid composites were investigated as solvent-free electrolytes for lithium batteries. Ternary electrolytes based upon PEO, an ionic liquid and a conducting salt were UV cross-linked with benzophenone as a photoinitiator. Cross-linking leads to an increase in mechanical stability of the PEO composites. This straight-forward process provided a way to increase the content of ionic liquid and thus to raise ionic conductivity without loss of mechanical stability. Impedance measurements showed that the ionic conductivity of the composites was not affected by the UV curing process. Moreover, the UV curing process caused a decrease in the degree of crystallinity in the PEO composites which contributed to an increase in ionic conductivity.

What is needed is a re-chargeable battery design that combines the benefits of utilization of optimized components including a non-dendrite forming sodium/potassium liquid metal anode, a sulfur/polyacrylonitrile (PAN) conductive polymer composite cathode, a cross-linked solid polyethyleneoxide (PEO) polymer electrolyte, and a stable interface (SEI) on the solid PEO polymer electrolyte without any of the reported inherent drawbacks associated with prior usage of the individual components in other designs.

BRIEF DESCRIPTION OF THE DRAWINGS

The foregoing aspects and others will be readily appreciated by the skilled artisan from the following description of illustrative embodiments when read in conjunction with the accompanying drawings.

FIGS. 4A and 4B illustrate voltage profiles of a cell during a charge and discharge processes. FIG. 4B is an enlargement of one charge and discharge cycle as shown in FIG. 4A.

DETAILED DESCRIPTION

Various embodiments of the invention describe a re-chargeable battery design that comprises a non-dendrite forming sodium (Na)/potassium (K) liquid metal alloy anode, a sulfur/polyacrylonitrile (PAN) conductive polymer composite cathode, a cross-linked solid polyethyleneoxide (PEO) polymer with a Na and K based salt (e.g. sodium triflate and potassium triflate) electrolyte, and a stable interface (SEI) on the solid PEO polymer electrolyte without any of the previously reported inherent drawbacks associated with prior designs. Various embodiments of the invention will enable the usage of both low cost materials and a low cost production process for sulfur based low cost and safe rechargeable batteries for large scale energy storage applications. Additional advantages of such a design are that all materials are naturally abundant, the large-scale production of these materials is already in place, the design is inherently safe (thermal dynamically prohibit dendrite formation), and a low cost manufacturability is possible.

Figure 1:
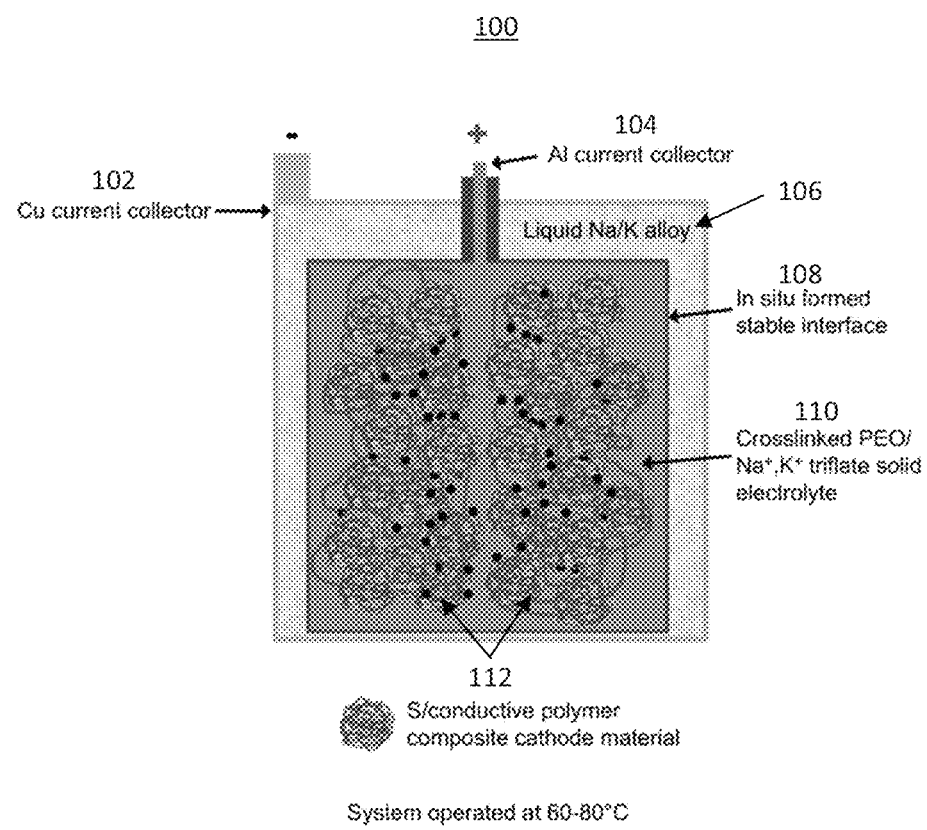
FIG. 1 illustrates a schematic diagram of low temperature sulfur and sodium re-chargeable metal battery according to an embodiment of the invention.

FIG. 1 illustrates a schematic diagram of a low temperature sulfur cathode and sodium/potassium anode re-chargeable metal battery 100 according to an embodiment of the invention. The re-chargeable metal battery 100 comprises a Cu current collector 102, an aluminum current collector 104, a sodium (Na)/potassium (K) liquid alloy anode 106, an in situ formed stable interface (or solid electrolyte interface as SEI) 108, a cross-linked polyethyleneoxide (PEO) 110 solid electrolyte, and a sulfur/polyacrylonitrile (PAN) conductive polymer composite cathode 112.

An embodiment of the invention describes the utilization of a sodium (Na)/potassium (K) liquid alloy anode 106. Within a certain ratio of Na/K, the alloy is liquid. Therefore, metal dendrite formation is completely prohibited. Potassium and sodium are miscible in all portions. The alloy, in concentrations of 40-90 wt. % K, is a liquid at room temperature. The potassium-sodium alloy is not soluble in hydrocarbons or ethers. In one embodiment of the invention the anode 106 composition is described as follows: sodium and potassium alloy at 56% K and 44% Na by weight with an excess of Na/K alloy in the anode 106.

By tuning the Na and K ratio in the alloy, the melting point of the mixture can be controlled. An embodiment of the invention describes the control of the melting point of the alloy below the operational temperature of the re-chargeable battery 100 so that the metal alloy anode 106 will be a liquid to prohibit dendrite growth. In one embodiment, a K—Na alloy eutectic mixture at 78 wt. % K and 22 wt. % Na has a melting point of −12.6° C.

An embodiment of the invention describes the use of the cross-linked PEO and Na and K based salt solid polymer electrolyte 110. The Na and K salt dissolved in PEO polymer forms a good solid polymer electrolyte 110 for conducting Na and K ion for this re-chargeable battery system 100. The PEO will be UV cross-linked with a benzophenone initiator. For a further discussion on cross-linking PEO with a benzophenone initiator, see Barbara Rupp, Martin Schmuck, Andrea Balducci, Martin Winter, Wolfgang Kern, Polymer electrolyte for lithium batteries based on photochemically cross-linked poly(ethylene oxide) and ionic liquid. European Polymer Journal 44 (2008) 2986-2990, the disclosure of which is incorporated herein by reference in its entirety for all purposes.

This is a solid electrolyte 110 and a Na/K ion conducting membrane that also serves to block the Na/K alloy metal anode 104 from contacting the sulfur cathode 112. On the surface of the solid polymer electrolyte 110, a protective layer (SEI) 108 can form to stabilize the solid polymer electrolyte 110 and the Na/K liquid alloy electrode/anode 106.

In one embodiment, the solid polymer electrolyte 110 comprises the polyethyleneoxide (PEO), and sodium triflate and potassium triflate, and 5 wt. % of benzophenone. The PEO oxygen to Na ion ratio is at 20:1 and the PEO oxygen to K ion ratio is at 20:1. The solid polymer electrolyte 110 will be cast as a membrane and UV cross-linked to form a stable ion-conducting separator. The solid polymer electrolyte 110 can also be used both as a cathode binder (sulfur/conductive polymer composite) and an electrolyte 110 in the cathode composition. In one embodiment, this solid polymer electrolyte 110 will ideally operate between 60-80° C. The separator/solid PEO electrolyte/membrane 110 composition is described as follows: PEO (0.5 g), Sodium triflate (0.12 g) and potassium triflate (0.16 g) salts. An estimated thickness is approximately 80-250 μm.

An embodiment of the invention describes the use of a stable interface (SEI) 108 on the solid PEO electrolyte/membrane 110. This is a new and enabling concept. In most of the Li metal based systems, the stable interface (SEI) is on a metal surface. An embodiment of the invention forms a stable interface (SEI) 108 at the PEO solid polymer electrolyte membrane 110 surface.

An embodiment of the invention describes the use of a sulfur and polyacrylonitrile (PAN) conductive polymer cathode 112. The cathode 112 composition is described as follows: PEO(0.5 g); Sodium triflate(0.12 g); Potassium triflate(0.16 g); Sulfur-PAN composite(0.4 g); AB(0.15 g). Active material sulfur in cathode:0.062 mg. Cathode area: 1.6 cm². For a further discussion on sulfur composite cathode materials, see Jiulin Wang, Jun Yang, Yanna Nuli, Rudolf Holze. Room temperature Na/S batteries with sulfur composite cathode materials. ScienceDirect Electrochmistry Communications 9 (2007) 31-34, the disclosure of which is incorporated herein by reference in its entirety for all purposes.

Preparation of the sulfur and polyacrylonitrile (PAN) conductive polymer is described as follows: typically, sublimed sulfur (with purity of 99.99%) is thoroughly mixed with polyacrylonitrile (PAN). Ethanol is used as dispersant to improve the mixing of sulfur and PAN. After drying, the mixture is heated to 300° C. and dwelled for 6 hours under argon gas. A black, powdery material was obtained.

RESULTS

Figure 2:
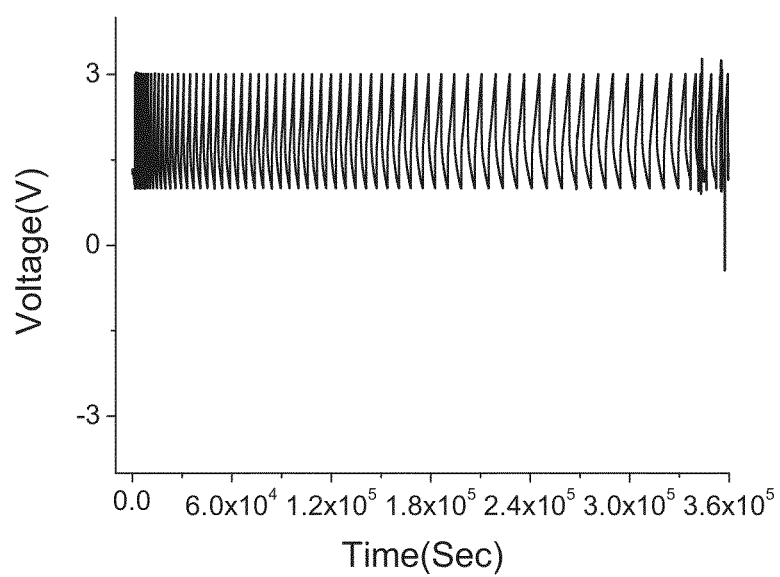
FIGS. 2 and 3 illustrate the extended cycling performance of the NaK/S cell.
Figure 3:
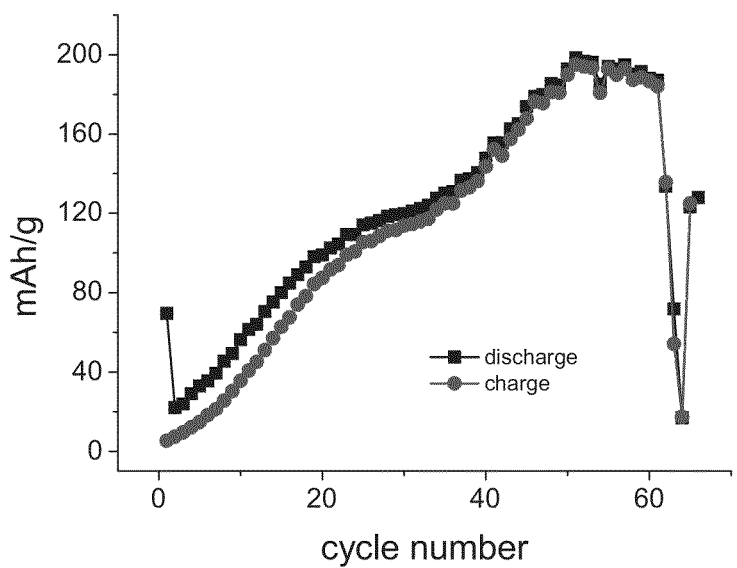

FIGS. 2 and 3 illustrate the extended cycling performance of a NaK/S cell. A theoretical capacity of 568 mAh/g is calculated for a sulfur cathode. A theoretical capacity for $Na_2S$ is 680 mAh/g and $K_2S$ is 480 mAh/g. A theoretical capacity of the cathode is estimated based on the assumption that the formation of both salts based on the weight ratio of Na and K in the alloy.

FIGS. 4A and 4B illustrate voltage profiles of the cell during charge and discharge processes. FIG. 4B is an enlargement of one charge and discharge cycle as shown in FIG. 4A.

What is claimed is:

1. A re-chargeable battery comprising:
    a non-dendrite forming sodium (Na)/potassium (K) liquid metal alloy anode;
    a sulfur and polyacrylonitrile (PAN) conductive polymer composite cathode;
    a polyethyleneoxide (PEO) solid electrolyte;
    a solid electrolyte interface (SEI) directly in contact with the PEO solid electrolyte, wherein the PEO solid electrolyte completely surrounds the sulfur and PAN composite cathode; and
    a cell housing, wherein the anode, cathode, and electrolyte are assembled into the cell housing.

2. The re-chargeable battery of claim 1, wherein the PEO solid electrolyte comprises a sodium triflate salt and a potassium triflate salt.

3. The re-chargeable battery of claim 1, wherein a potassium concentration in the sodium and potassium alloy is approximately 40% K to 90% K by weight.

4. The re-chargeable battery of claim 2, wherein the sodium and potassium liquid metal alloy is approximately 56% K and 44% Na by weight.

5. The re-chargeable battery of claim 1, wherein the PEO is cross-linked.

6. The re-chargeable battery of claim 5, wherein the PEO is UV cross-linked with a benzophenone initiator.

7. The re-chargeable battery of claim 1, wherein the PEO solid electrolyte is a Na/K ion conducting membrane.

8. The re-chargeable battery of claim 1, wherein the PEO solid electrolyte prevents the anode from contacting the cathode.

9. The re-chargeable battery of claim 1, wherein the PEO oxygen to Na ion ratio is at 20:1 and the PEO oxygen to K ion ratio is at 20:1.

10. The re-chargeable battery of claim 1 wherein the anode comprises a copper Cu current collector.

11. The re-chargeable battery of claim 1, wherein the cathode comprises an aluminum Al current collector.

* * * * *